United States Patent [19]

Benyacar et al.

[11] Patent Number: 5,003,584

[45] Date of Patent: Mar. 26, 1991

[54] METHOD AND APPARATUS FOR THE BILLING OF VALUE-ADDED COMMUNICATION CALLS

[75] Inventors: Irving Benyacar, Englishtown; Elizabeth V. Courte, Fair Haven; Albert Friedes, East Brunswick; Thomas P. Howe, Whitehouse Station, all of N.J.; David D. Kaufman, Atlanta, Ga.; James R. Magura, Basking Ridge, N.J.; Rachelle E. Rees, Holmdel, N.J.; Pamela A. Steinert, Farmingdale, N.J.; Mohan Venkataramana, Tinton Falls, N.J.; Yong Zhou, Washington Township, Morris County, N.J.

[73] Assignee: AT&T Bell Laboratories, Murray Hill, N.J.

[21] Appl. No.: 509,662

[22] Filed: Apr. 16, 1990

[51] Int. Cl.⁵ .................. H04M 15/04; H04M 15/08
[52] U.S. Cl. .................................. 379/119; 379/121; 379/135; 379/201
[58] Field of Search ............... 379/112, 113, 119, 120, 379/114, 121, 135, 201

[56] References Cited

U.S. PATENT DOCUMENTS 4,726,056 2/1988 An et al. ........................ 379/115
4,757,267 7/1988 Riskin ............................ 379/201 X

OTHER PUBLICATIONS

"Mass Announcement System", *Engineering and Operations in the Bell System,* Second Edition, *Reorganized and Rewritten Telecommunications in the Bell System in 1982–1983,* pp. 513–516.
"Announcing a Telecommunications Breakthrough for Caller–Paid Services: AT&T MultiQuest", BP 3308-01, 12/88, promotional brochure.

*Primary Examiner*—Stafford D. Schreyer
*Attorney, Agent, or Firm*—John A. Caccuro

[57] ABSTRACT

A call billing method and apparatus specifies, on a call-by-call basis, the calling charges incurred by a caller during a call to a sponsor-provided value-added service. The method provides the sponsor real time access to rate tables to specify call billing parameters needed to rate calls made to a sponsor number. A billing number is determined and validated and used to identify the party to receive a billing record for the call. A separate billing record is created for each call to the sponsor's number which includes sponsor-specified charges determined using the call billing parameters. Another feature enables the caller or called party to provide call billing parameters for billing and identificaiton purposes.

40 Claims, 10 Drawing Sheets

FIG. 4

AMA BILLING RECORD

| INFORMATION |
|---|
| CALL TYPE |
| CONNECT DATE |
| TIMING INDICATOR |
| STUDY INDICATOR |
| ANSWER INDICATOR |
| SERVICE OBSERVED, TRAFFIC SAMPLED |
| 401 — OPERATOR ACTION |
| SERVICE FEATURE |
| 402 — ORIGINATING NPA |
| 403 — ORIGINATING NUMBER |
| 404 — DIALED NPA (900) |
| 405 — DIALED NUMBER |
| DESTINATION OVERSEAS INDICATOR |
| 406 — DESTINATION NPA |
| 407 — DESTINATION NUMBER |
| 408 — CONNECT TIME |
| 409 — ELAPSED TIME |
| OPERATOR CHARGE INDICATOR |
| BILL TO INDICATOR |
| SERVICE INDICATOR CODE |
| SERVICE FEATURE INDICATOR |
| CUSTOMER RAO NUMBER |
| 410 — CUSTOMER FEATURE AVAILABLE |
| ANNOUNCEMENT BEFORE ROUTING |
| CALL PROGRESS STOPPED |
| 420 ⎰ IPL INITIAL PERIOD LENGTH |
| APL ADDITIONAL PERIOD LENGTH |
| FPL FREE PERIOD LENGTH |
| IPR INITIAL PERIOD RATE |
| APR ADDITIONAL PERIOD RATE |
| SAI SUBACCOUNT INDICATOR |
| RM RATE MODIFIERS |

FIG. 7

| DIALED NO. | ROUTE NUMBER | SPONSOR RECORD |||||||
|---|---|---|---|---|---|---|---|---|
| | | RATES ||| ... | SCI |||
| | | IPL, IPR | APL, APR | RM | | INDICATORS || ... | DESCRIPTORS ||
| | | | | | | SAI CALLER | SAI SPONSOR | BOP | | CALLER DISC | SPONSOR DISC | ... |
| NXX-XXX1 | SSS-TTT-XXXX | | | | ... | | | | ... | | | |
| ... | ... | | | | | | | | | | | |
| NXX-XXX9 | SSS-TTT-XXXY | | | | | | | | | | | |

| DIALED NO. | ROUTE NUMBER | SPONSOR RECORD |||||||
|---|---|---|---|---|---|---|---|---|
| | | RATES ||| ... | SCI |||
| | | IPL, IPR | APL, APR | RM | | INDICATORS || ... | DESCRIPTORS ||
| | | | | | | SAI CALLER | SAI SPONSOR | BOP | | CALLER DISC | SPONSOR DISC | ... |
| NXX-XXX1 | SSS-TTT-XXYX | | | | ... | | | | ... | | | |
| ...... | ...... | | | | | | | | | | | |

METHOD AND APPARATUS FOR THE BILLING OF VALUE-ADDED COMMUNICATION CALLS

TECHNICAL FIELD

This invention relates to a telecommunication billing method and apparatus for specifying and calculating the billing charges associated with value-added communication calls.

BACKGROUND OF THE INVENTION

The new value-added services (e.g., 700 number and 900 number services) are designed for mass calling to a service provider (sponsor) number with the calling party generally paying for the call. These 900 number services (e.g., DIAL-IT ®900-service offered by American Telephone and Telegraph Co. - AT&T) allow sponsors to offer a variety of value-added telecommunication services (Dial-A-Prayer, Televoting, etc.), to their clientele for which additional charges are assessed. To access the service the clientele (caller) dial, illustratively, a 900-NXX-XXXX number and are routed to a Carrier Switch Network (CSN) Mass Announcement System (MAS) where the callers listen to the sponsor's prerecorded announcement. At present, the sponsors select the rate callers will pay for the service when the 900 number is assigned by the CSN. The 900 number and the rate selected by the sponsor are stored in a rate table in a CSN billing system. When a call is made to a sponsor's 900 number, the central office switch in the Local Exchange Company (LEC) makes a call record including the calling and called party of each call. These call records are transported periodically (typically every month) from the LEC to the CSN, and rated using the appropriate sponsor's rate table. This rating process involves a table look-up process to determine each caller's charge for a call to a particular sponsor's number. The resulting caller charge records are then returned to the LEC which includes the charges as part of the caller's monthly bill.

New carrier network services now provide the sponsor more flexibility in defining their services by routing the value-added calls to a sponsor-selected location. One such service is the MultiQuest ® telecommunications service offered by AT&T. These new services enable a sponsor to provide a greater variety of value-added services which may now include interactive dialog between the caller and the sponsor's agent. Notwithstanding these valuable new services, there is a continuing need for carrier networks to ade enhancements to these sponsor-provided value-added services.

SUMMARY OF THE INVENTION

In accordance with the billing method and apparatus of the present invention, sponsors are provided with more flexibility in the billing of the sponsor's value-added services. Billing flexibility is achieved in accordance with the invention by creating a separate billing record for each call using sponsor-provided call billing parameters which can be updated substantially in real time by the sponsor. Desirably, determining sponsor charges and creating a billing record on a call-by-call basis eliminates the need for the table look-up procedure required by the prior art call billing methods.

In accordance with one feature of the present invention, the sponsor-provided call billing parameters (e.g., call rate data either flat or per rate interval) may be changed substantially in real time. The term "substantially in real time" is defined herein as the time it takes a computer to update a sponsor's record using sponsor-entered call billing parameters (generally in the order of minutes). In one embodiment, the billing system is incorporated in the carrier switch network (CSN). The network (CSN) permits the sponsor to directly access or connect to the network's operations support system substantially in real time to specify the call rate data and other associated call rate modifiers (e.g., call type, time-of-day, geographic regions, etc.). These sponsor-specified call billing parameters are then incorporated into the standard Automatic Message Accounting (AMA) record generated by CSN for each call and sent to the billing system which processes the sponsor charges for inclusion in the network bill sent to the customer. Additionally, sponsor call billing parameters which identify sponsor subaccounts and/or specify text messages to be included in the caller's bill can also be changed substantially in real time. Moreover, in accordance with the present invention, caller or called party provided call billing parameters may also be included in the AMA records for subsequent billing and identification purposes. Also, the network may add additional data to the AMA record for inclusion in a sponsor bill and or a caller bill.

Using this invention, the callers can charge their value-added calls to their telephone number, carrier-provided credit cards (e.g., calling cards), commerical credit cards (e.g., Visa, American Express), or use Sponsor-Created Credit cards (SCC) for the service. This invention also permits a convenient scheme for the sponsors to create and maintain their own specialized credit cards to meet the unique needs of their service. The network provides the authorization, validation, billing and collection services for the sponsor's credit card.

The present invention also allows the sponsor to vary the charges for a value-added call at any time. The sponsor may define the rates prior to the call set-up. The sponsor is also able to modify the charges associated with the call while the call is in progress or even after the call has been terminated.

BRIEF DESCRIPTION OF THE DRAWING

In the drawing

FIG. 4 shows a typical AMA billing record used to bill callers for calls made over the network;

FIG. 7 shows an illustrative sponsor record utilized with the present invention;

GENERAL DESCRIPTION

Figure 1:
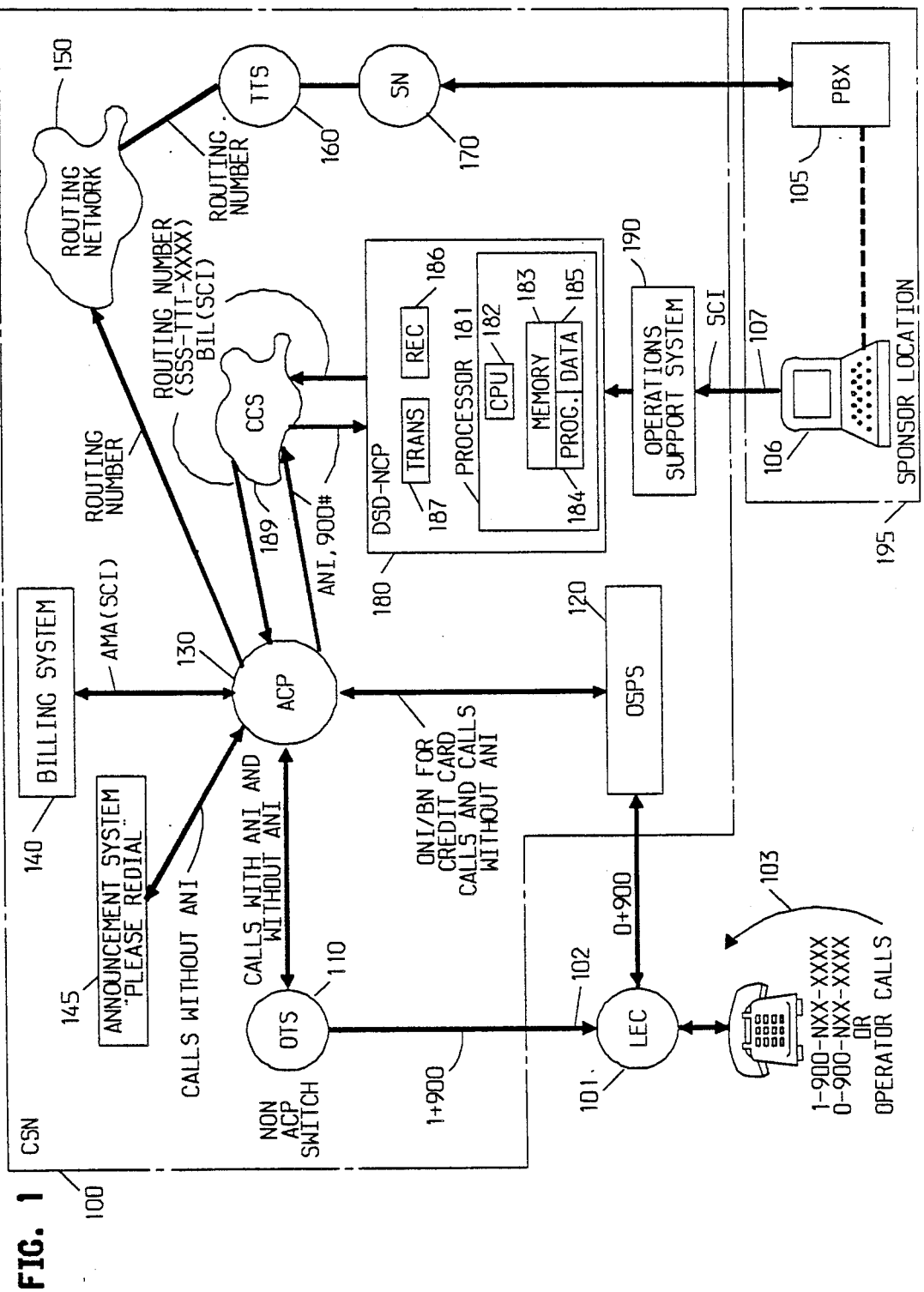
FIG. 1 shows, in block diagram form, an illustrative carrier switch network (CSN) useful in describing the operation of the present invention.

Before proceeding with the operating description of the inventive method and apparatus for billing value-added communication calls, it should be recognized that the apparatus and method of the invention may be adapted for use with a variety of different systems which can be arranged to implement the switching network configuration shown in FIG. 1. Since the various systems shown in FIG. 1 utilize a variety of hardware and programming techniques, no attempt is made to describe the existing programs used to control these various systems. However, using the following description as a guide, the operation of the present invention can be readily integrated into the control structure of the various systems of FIG. 1, and tailored to cooperate with other features and operations of those systems. Thus, in order to avoid confusion and enable those skilled in the art to practice the claimed invention, this specification will describe the operation of the present invention using the network block diagram of FIG. 1, the call flow diagrams of FIGS. 2, 5, 8, 9 and 10 and the various commands, records and database as shown in FIGS. 3, 4, 6 and 7. In the following description, the first digit of an element's reference number designates the first figure where the element is located (e.g., 101 is located in FIG. 1).

With reference to FIG. 1, there is illustrated a block diagram of a well-known switching network configuration useful in describing the operation of the present invention. The drawing illustrates a Local Exchange Carrier (LEC) 101 and a Carrier Switch Network (CSN) 100. The LEC 101 serves telephone station 103, and enables this station to complete calls to other stations (not shown) of the network in a well-known manner. The CSN 100 also enables station 103 to access value-added services provided by vendors (sponsors) via equipment such as private branch exchange (PBX) 105 connected to CSN 100.

The CSN 100, illustratively, may comprise Originating Toll Switch (OTS) 110, Operator Services Position System (OSPS) 120, ACtion Point (ACP) 130, billing system 140; routing network 150, and Terminating Toll Switch (TTS) 160, Service Node (SN) 170, Network Control Point (NCP) 180 and Operations Support System (OSS) 190 and announcement system 145.

While LEC 101 is shown, illustratively, to connect via facility 102 to OTS 110 in FIG. 1, it may equivalently also connect directly to ACP 130. Thus, OTS 110, and ACP 130 are points in CSN 100 which usually interface to other networks (e.g., LEC) or may directly connect to telephone stations (e.g., 103). Since OTS 110, in our example, does not contain the ACP software, it is considered a non-ACP switch. Consequently, all calls originated through OTS 110 must be directed to a toll switching office having ACP 130 software (e.g., 130), hereinafter designated as an ACP 130. The ACP 130 is characterized as having a Common Channel Signaling (CCS) network connection to centralized data bases referred to as a Network Control Point (NCP). Some NCPs, e.g., 180, have Direct Services Dialing (DSD) capability which permits direct access by ACP 130 offices using dialing codes. The DSD-NCP 180 is hereinafter referred to as NCP 180.

The CCS 189 direct signaling facilities which link ACP 130 and NCP 180 are, basically, a packet switching system for routing messages in accordance with their address data contents. CCS 189 network features are disclosed in the Feb., 1978, *Bell System Technical Journal* (BSTJ) No. 2 and in W. B. Smith, et al., U.S. Pat. No. 3,624,613 of Nov. 30, 1971.

The structure and general operation of ACPs and NCPs is described in R. L. Asmuth, U.S. Pat. No. 4,611,094 which is incorporated herein by reference.

The NCP 180 is a centralized data base facility which is controlled by a processor 181 comprising CPU 182 and memory 183. The memory stores a system of programs 184 to establish, edit and manage information stored in its data memory 185. The program memory 184 includes and utilizes the special program steps outlined in the flow charts of FIGS. 2 and 3 and the data of billing command of FIG. 4 for implementing the present invention. By way of example, NCP 180 may comprise an AT&T company 3B20D processor equipped with disk storage. A receiver 186 of NCP 180 receives data signals over a facility from CCS 189. A transmitter circuit 187 is included for signaling messages from NCP 180 over a facility to CCS 189 and then to ACP 130.

The operation of Network Control Point (NCP) 180 is also described, for example, in the D. Sheinbein, et al., article on pp. 1737–1744 of *Bell System Technical Journal* (BSTJ), Sept., 1982, Volume 61, No. 7, part 3. The changes in the operation of NCP 180 to perform the functions of the present invention are described in later paragraphs.

The general operations of an Operations Support System (OSS) 190 is described in, for example, "Operations Systems Technology for New AT&T Network and Service Capabilities", Robert Merski and D. Mark Parish, Page 64, *AT&T Technical Journal*. May/June 1987, Vol. 66, Issue 3. The changes in the operations of OSS to perform the described features of the present invention are described in a later paragraph.

An illustrative OSPS 120 is described in the article written by N. X. DeLessio, et al.: "An Integrated Operator Services Capability for the 5ESS Switching System", *International System Symposium*, (Florence), Session 22C, Paper 3, pp. 1–5, May, 1984.

It should be noted that the structural details of LEC 101, toll offices OTS 110 and the OSPS 120 form no part of the present invention and are only described herein to the extent necessary for an understanding of the invention.

LEC 101 may be, illustratively, a 5ESS ® (electronic switching system). The 5ESS is extensively described by K. E. Martersteck, et al., in *AT&T Technical Journal*, Volume 64, No. 6, part 2, pp. 1305–1564, July/Aug., 1985. The above-identified disclosures and the citations referred to therein may be consulted for a complete understanding of the construction and operations of a typical toll office.

The OTS 110, ACP 130 and TTS 160 may be, illustratively, an electronic program-controlled telephone system of the No. 4ESS design as described by A. E.

Ritchie, et al., in the *Bell System Technical Journal (BSTJ)*, Sept., 1977, Volume 56, No. 7.

The service node 170 is an interface which enables compatible signaling between the No. 4ESS system and the sponsor's equipment 105 (typically, a private branch exchange - PBX).

DETAILED DESCRIPTION

In accordance with the method and apparatus of the present invention, when a customer (e.g., caller at station 103) dials a value-added call to a sponsor number, the call is routed to a sponsor location (e.g., PBX 105) and any sponsor-specified charges incurred during the call are separately determined for each call and included in the network bill to the caller. It should be understood that the term "sponsor" as used herein includes any person acting on behalf of the sponsor. The sponsor-specified charges are incurred for value-added services provided by the sponsor during the call. The sponsor-specified charges are determined using sponsor-provided call billing parameters which may change substantially in real time by the sponsor. Note, while a value-added call is described herein as using a 900 access code, it should be understood that other service access codes could be used to signify a value-added call. While the present invention has been described for value-added service calls using 900 numbers, it should be understood that it may also be used with other telecommunication services, for example 976-XXXX number calls.

The present invention enables the sponsor (at PBX 105) to interactively specify (to OS 190) call billing parameters which specify, e.g., the call rate data and other associated call rate modifiers (e.g., time-of-day, geographic rates, etc.). These sponsor-specified caller charges are transported (from NCP 180 via ACP 130) on a call-by-call basis to the billing system (140). The billing system recognizes and processes the sponsor-specified charges for inclusion in the network bill to the customer (caller).

Figure 2:
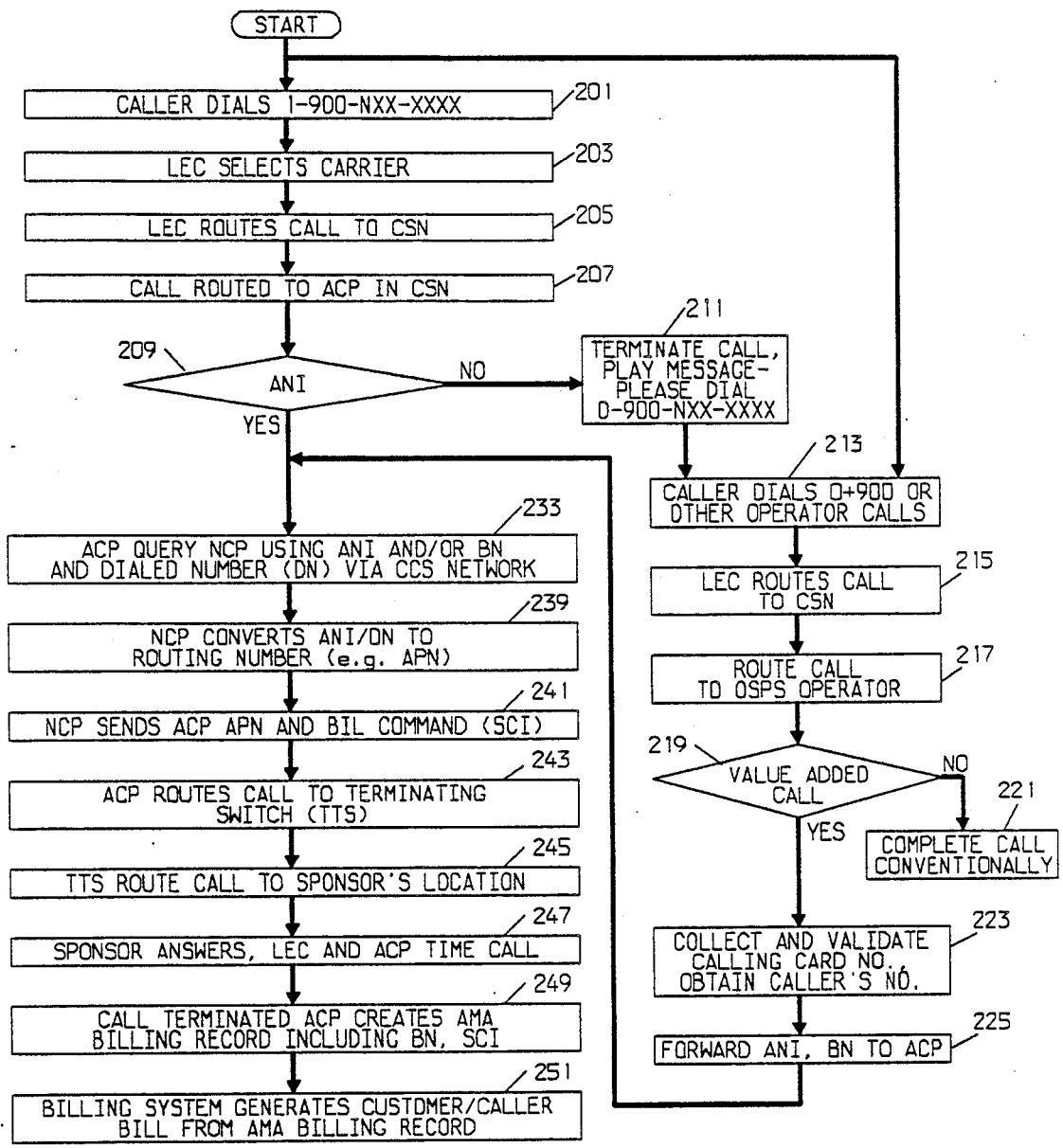
FIG. 2 shows a call flow diagram of the operation of the billing system and the CSN in accordance with the operation of the present invention.

With joint reference to FIGS. 1 and 2 we describe, in more detail, the inventive method and apparatus for the billing of a value-added communication call originated by a caller at station 103 and terminating at sponsor equipment 105. One illustrative value-added communication service which operates in accordance with the present invention is an enhancement of the previously referenced MultiQuest telecommunication service offered by American Telephone and Telegraph Co., (AT&T).

Assume initially, in step 201, that a caller at station 103 dials 1-900-NXX-XXXX where the N digit is any number between 2-9 and each of the X digits is any number between 0-9. The LEC 101 receives the dialed number and, in step 203, selects the long distance carrier using the dialed 900 number. In our example, we assume that the dialed 900 number specifies AT&T as the Carrier Switch Network (CSN) 100. Note, while the operation of the present invention is described with reference to the AT&T CSN 100, the present invention could be adopted in a straightforward manner to operate with other CSN arrangements. In step 205, LEC 101 routes the call to CSN 100 where it is received by OTS 110. It should be noted that the originating LEC 101 may be either an Equal Access End Office (EAEO) or a Non-Conforming Office (NCO). An EAEO location has Automatic Number Identification (ANI) capability which enables the caller's number to be provided to OTS 110. The ANI number is required for billing the calling party for any calling charges and any value-added service charges.

If the caller's LEC 101 is an NCO location, ANI is not available and, hence, the caller's number must be obtained by CSN 100 directly or by using the assistance of an operator.

The OTS 110 recognizes the dialed number as a value-added service number (e.g., a MultiQuest service call) and routes the call, in step 207, to ACP 130 for further call processing. ACP 130 determines from the incoming trunk group identity that the call is a direct-dialed call and not an operator-assisted call. Note, in an alternate embodiment, both direct-dialed (1-900 calls) and operator-assisted calls (0-900 and operator-assisted calls) may be received at the ACP 130, via OTS 110, without OSPS 120 intervention. In such a case, the ACP 130 forwards calls to the OSPS 120. It should be noted that the operation of the present invention is the same for both of these embodiments.

In step 209, ACP 130 determines whether an ANI number is received from OTS 110, if so, call processing continues in step 233; if not, the call is blocked or terminated with an appropriate message in step 211. An illustrative message (from announcement system 145) in step 211 informs the caller that "your call cannot be completed as dialed. Please redial your call as 0-900-NXX-XXXX".

For direct-dialed calls which are blocked (i.e., those without ANI numbers) as well as those calls for which the caller desires operator assistance, the caller dials 0-900-NXX-XXXX (step 213). When CSN 100 is the AT&T network, the caller may also reach OSPS 120 without the intermediate LEC 101 screening.

LEC 101 identifies the call as an AT&T network call and routes the call to CSN 100, in step 215. In step 217, the call is sent by LEC 101 to an OSPS 120 for operator assistance. The OSPS 120 identifies the call as a value-added service call, in step 219, by interpreting the dialed number. If the call is not a value-added call, then it is handled, in step 221, in the appropriate manner by OSPS 120. That is, the call may be appropriately completed or blocked.

If the call is recognized as a value-added call, OSPS 120 may automatically collect the caller's telephone or charge card number or may connect an operator to collect the caller's number. The caller's telephone number (ANI) or charge card number will be used to bill charges incurred by the caller during the call.

Under the automatic card number collection procedure, in step 223, OSPS 120 provides a "bong" tone to the caller, collects the charge card number, (e.g., an AT&T credit card number or commercial credit card number), and requests and receives a credit card validation. In step 225, OSPS 120 forwards the card number to the ACP 130 for call processing. Note, some telephone credit cards use ANI plus a PIN (4-digit personal identification code) as the credit card validation. If the caller enters digits which correspond to the Sponsor-Created Credit cards (SCC), these numbers are forwarded to the ACP for further call processing. Validation of these card numbers are performed within the network at the NCP. If the caller does not enter the digits, the call is connected to an operator who obtains the caller's number (ANI) and/or charge card number (i.e., billing number), which is forwarded to the ACP 130 for further call processing.

In step 233 ACP 130 sends a query, which includes the 10-digit dialed number (called party) and the ANI and/or billing number, over the CCS network 189 to NCP 180. The CCS network 189 routes the query, based on the dialed number, to the appropriate NCP, NCP 180 in our example.

In step 239 NCP 180 uses the dialed number (DN) (900-NXX-XXXX) to access the NCP data base to identify the sponsor assigned to the dialed number. The dialed number is also used to access the sponsor record (FIG. 7) to generate a routing number which specifies call routing over CSN 100. In step 241, NCP 180 returns the routing number as well as a network message specifying the parameters for an automatic message accounting (AMA) record (FIG. 4) of this call.

Figure 3:
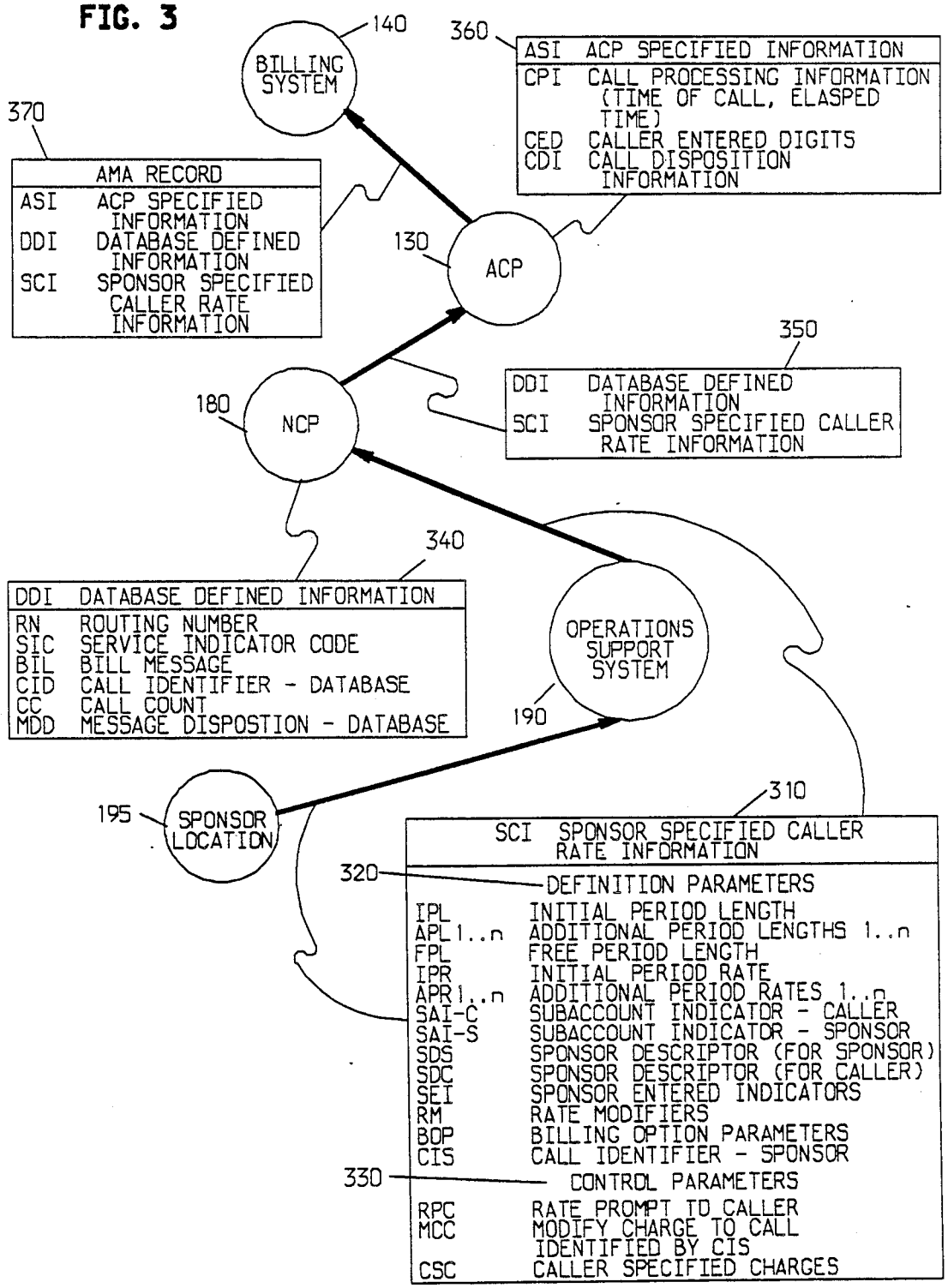
FIG. 3 describes the mechanism by which the sponsor sends the rate information to the billing system via the Operations Support System (OSS), the Database and the Switch (e.g., ACtion Point ACP). The parameters added by the OSS, Database and the ACP and the contents of the intermediate messages are also shown in the figure.

FIG. 3 illustrates the messages in the network as they pertain to the present invention. The messages originate at the sponsor's location 195, where the sponsor can specify several parameters using a terminal. In accordance with the present invention, the sponsor will be able to specify the following parameters in the caller rate information which are divided into two categories. The first category is called "Definition Parameters" 320 which specify the information necessary to create and process proper bills to the caller and the sponsor. The second category is called the "Control Parameters" 330. These parameters define actions in the network which the sponsor can specify for the purpose of this invention. The Definition Parameters 320 and Control Parameters 330 are, together, known as the Sponsor-Specified Caller Rate Information (SCI) 310.

In accordance with the present invention, the sponsor-specified "Definition Parameters" 320 include, but are not limited to, the following parameters:

Initial Period Length (IPL), ranging from 0 sec to infinity or "flat charge".

Initial Period Rate (IPR), to the nearest cent. Note, the rate may be the actual price or a pointer to a table containing a list of prices.

Additional Period Length (APL), ranging from 0 sec to infinity or "flat charge".

Additional Period Rate (APR) to the nearest cent. Note the rate may be the actual price or a pointer to a table containing a list of prices.

The sponsor can specify additional combinations of period lengths (APL1..n) and Rates (APR..n) to define a more flexible rating structure.

Free Period Length (FPL), defining the free time the caller will have to hang up without incurring premium charges, ranging from 0 sec (no free time) to infinity (free call). The free period can also be used by the sponsor to advise the caller of the charges involved, or provide product advertisement.

The sponsor can specify two Subaccount Indicators (SAI-C) and (SAI-S). The Subaccount Indicator for the Caller (SAI-C) will appear in the caller bill to allow multiple billing categories for the caller. The SAI-C parameter can also be used by the sponsor to create their own credit cards (SCC), as described below. The Subaccount Indicator for the Sponsor (SAI-S) will be listed in the sponsor bill, and the sponsor, as a reseller, can use the SAI to identify their clients. The SAI-S, SAI-C and the Descriptor fields can be used by a reseller to identify one of the clients, and allows multiple clients to share a given 900 number during a billing period. When the billing systems create the bills, the SAI-S indicator will be included in the sponsor bill and the SAI-C indicator will be included in the caller bill. The reseller is able to sort the billing records using the SAI-S and bill their clients. The SAI parameters can also be used with the descriptors, defined below. Other uses of SAI parameters are possible.

SAI-C parameter can also be used as the Sponsor-Created Credit card (SCC) authorization number for the caller. In this embodiment of the invention, the sponsor is not restricted to the use of calling cards or Commerical Credit Cards. The sponsors can create their own credit cards easily by defining and maintaining a list of SAI-C parameters to validate the caller. The network provides the authorization, validation and collection services for the sponsor's credit card.

The sponsor can specify two descriptors (SDS and SDC). The Sponsor Descriptor for Sponsor (SDS) is a character string defined by the sponsor which appears in the bill created by the billing system for the sponsor. This allows the sponsor to describe in words the service category of the clients, and improves the quality of the billing record. The Sponsor Descriptor for the caller (SDC) is a character string defined by the sponsor which will appear in the caller bill. The SDC allows the sponsor to customize their messages for the value-added call. The sponsor can also change the display Descriptors substantially in real time.

The sponsor can also specify other Sponsor Entered Indicators (SEI) which are transported through the network and returned to the sponsor while the call is set up. The SEI will also be populated in the billing records created by the billing systems for the sponsor. This allows the sponsor to identify the nature of the call in real time and define appropriate treatment of the call based on its billing category.

The sponsor will be able to specify a Rate Modifier (RM) for the call, allowing modifications to the predefined rate structure of the value-added call. The Rate Modifier allows for a decrease in the rates (discounts), or an increase in the rates for the call (added charges).

The sponsor can uniquely identify a given call by defining the "Call Identifier-Sponsor" Indicator (CIS). The CIS indicator may be identical in format to the unique identifier for the call defined by the Database (CID), described below. By using the CIS parameter in conjuction with the other Sponsor-Specified Caller Rate Information (SCI) parameters, the sponsor can obtain unique billing treatment for a given value-added call. The CIS parameter also allows the sponsor to change the billing charges associated with a given call (a) prior to the call setup, (b) during the duration of the call, or (c) after the call has been terminated in the network.

In addition to the "Definition Parameters", the sponsor can also specify a set of "Control Parameters" 330. The parameters determine specific actions in the network to support this invention. These parameters include, but are not limited to, the following parameters:

The sponsor can specify a Rate Prompt to Caller (RPC) parameter, which instructs ACP 130 to play a message to the caller describing the charges associated with the call.

The Modify Charges to Call (MCC) parameter indicates to the network that the message is intended to redefine the charges associated with an earlier value-added call. The MCC parameter will be accompanied by the unique call identifier CIS described earlier, which points to the previous call whose charges need to be modified.

The Caller Specified Charges (CSC) parameter indicates that the charges associated with a particular value-added call will be determined by the digits entered by the caller in response to the announcements.

Additional parameters (e.g., to define the Sponsor-Created Credit Card, SCC) may also be defined.

The Sponsor-Specified Caller Rate Information (SCI), which includes the Definition Parameters 320 and the Control Parameters 330, are sent by the sponsor to the Operations Support System 190. The Operations Support System 190 forwards this information to NCP 180.

The NCP 180 can add additional parameters to the message. These are called Data Base (NCP) Defined Information (DDI), as shown by 340. This information includes parameters to route the call, provide basic billing capabilities for the value-added call, and define additional billing parameters to support the present invention. The DDI parameters include, but are not limited to, the following parameters:

The Routing Number (RN) parameters defines the destination number to route the call.

The Service Indicator Code (SIC) parameter identifies this call as a value-added call to the network.

The Billing Message (BIL) identifies that the ACP 130 should create a billing record for the call.

The Call Identifier-Database (CID) is a unique identifier defined by the NCP 180 for the value-added call. This parameter allows the sponsor to subsequently reference the billing records made for the call by defining the CIS parameter described earlier.

The Call Count (CC) is a special counter, defined by the NCP 180 to identify the number of calls during a time interval. The time interval may be under the control of the NCP 180 network or the sponsor.

The Message Disposition-Database (MDD) parameter defines to the ACP 130 and the billing system the disposition of this message. This parameter is required since the NCP 180 may send messages to ACP 130 and the billing systems even through there are no specific calls associated with the message (as when the sponsor requests to change the charges associated with a prior call).

The NCP 180 forwards the message 350 to ACP 130. The information includes the parameters contained in DDI 340 and SCI 310.

The above-described network message is generated by NCP 180 using the sponsor record data (FIG. 7) stored in its data memory 183. The generation of the sponsor record is described in a later paragraph.

We now return to describing the call flow description of FIG. 2. In step 243, the ACP 130 routes the call to the terminating toll switch TTS 160 indicated by the SSS digits of APN routing number. In our example, the call is routed through routing network 150 to TTS 160. In step 245, the TTS 160 routes the call to the sponsor location (e.g., PBX 105 in FIG. 1).

In step 247 when answer supervision is returned by the sponsor's equipment, the ACP 130 will start timing the call.

The ACP 130 adds an additional set of parameters to the message. The information set added by ACP 130 is called ACP Specified Information (ASI) 360. The ASI includes, but is not limited to, the following parameters to the message sent to the billing systems.

The ACP 130 defines a set of parameters collectively called Call Processing Information (CPI). This includes parameters such as Time of Call, Elapsed Time, etc.

The ACP 130 receives Caller Entered Digits (CED) which are sent to the billing system and to the sponsor.

The Call Disposition Information includes the response parameters from ACP 130 to the billing systems and the sponsor, detailing the disposition of the particular call.

The complete set of parameters, namely SCI, DDI and ASI define all the parameters required to support the present invention. This complete set is available at the ACP 130. The ACP 130 can send the complete set or any subset of these parameters to the billing system in the AMA record 370 as well as to the sponsor location. This flexibility allows various applications of the present invention to be implemented in the network.

We again return to the call flow description of FIG. 2. In step 249, when the call is terminated the ACP 130 creates an AMA billing record. FIG. 4 illustrates a typical AMA billing structure and typical parameters therein which may be utilized for billing the value-added service (e.g., MultiQuest service). Some of the various parameters (401–409) of the AMA structure are obtained from the network message of FIG. 3 as well as from the ANI, dialed number and APN information associated with the value-added call. The significant billing parameters in the AMA record are the billing number (BN) 404–405, connect time (CT) 408, elapsed time (ET) 409, and SCI 420. The connect time (CT) and the elapsed time (ET) are the values determined by ACP 130 in step 247.

In step 251, Billing System 140 generates the caller's and the sponsor's bills from the AMA billing record in a well-known manner. The caller's bill may, for example, appear on the telephone bill to station 103, on a third-party telephone bill, on a carrier credit card, or on a commercial credit card. The caller's bill may include the descriptor provided by the sponsor in the SCI.

The billing system 140 processes the AMA records to create aggregate and detailed call volumes and traffic patterns (e.g., geographic, time of day, calls blocked, etc.). The billing system also calculates the aggregate and detailed breakdown of revenues either payable to or receivable from the sponsor. The detailed sponsor billing records also contain subaccount indicators provided by the sponsor on a per call basis. This allows the sponsor to bill their clients or process the billing records in an appropriate manner.

Figure 5:
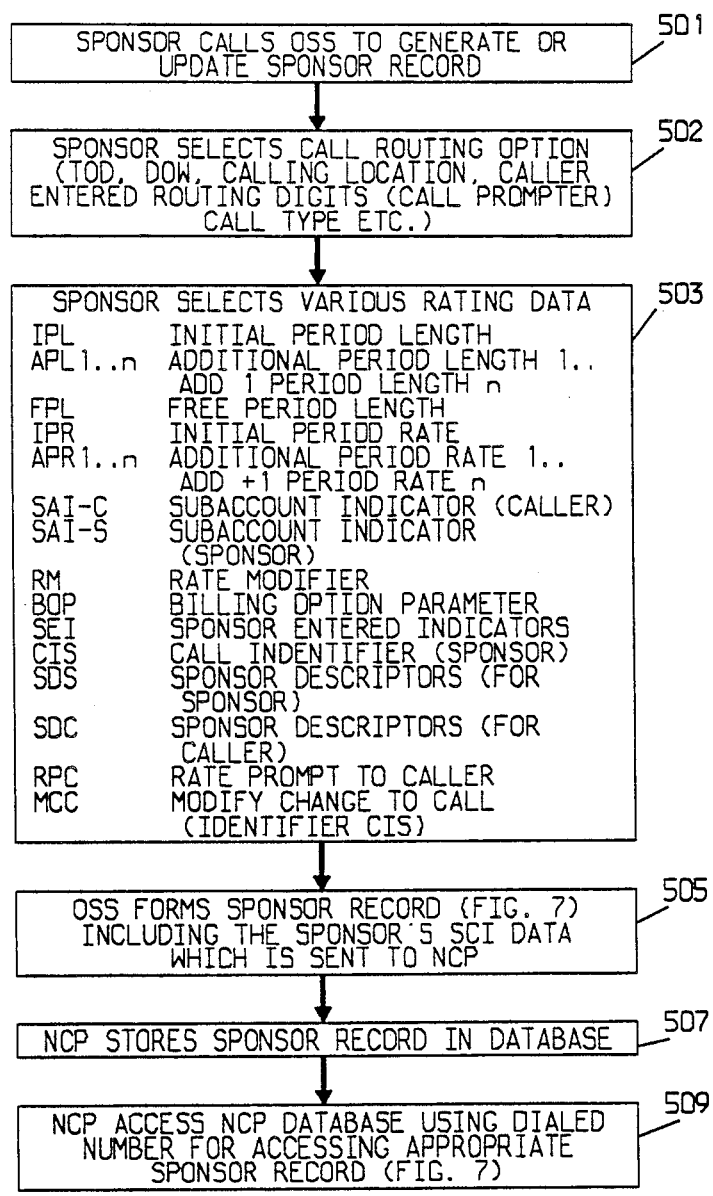
FIG. 5 shows a flow diagram describing sponsor's interaction with the billing system of CSN of FIG. 1 to select billing codes.
Figure 6:
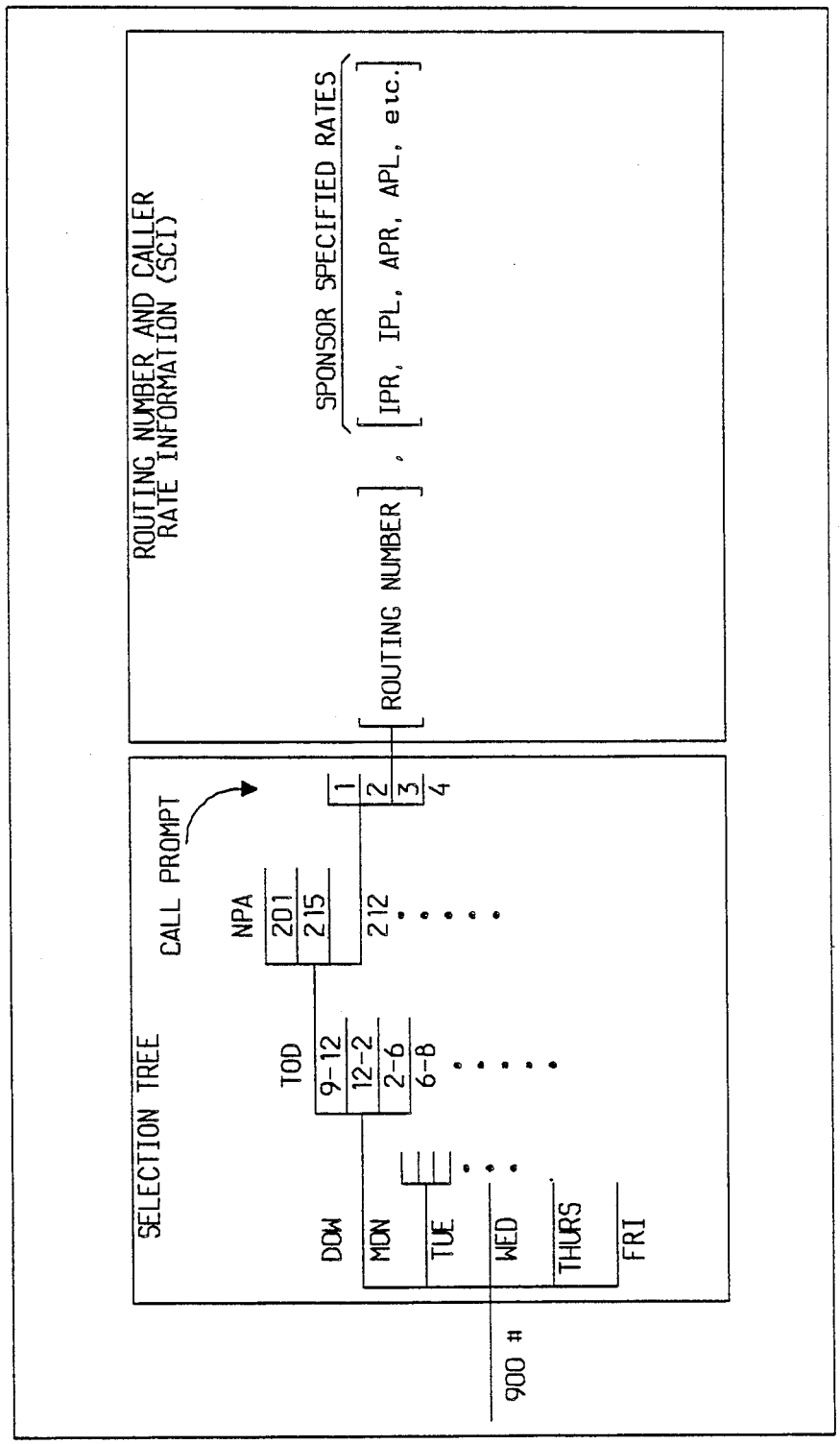
FIG. 6 shows a tree for enabling the sponsor to select various call billing parameters of Sponsor-Specified Caller Rate Information (SCI)

With reference to FIGS. 5-7, the detailed generation and update of the sponsor record is described. In step 501, the sponsor located at PBX 105 calls the support system 190 to interactively generate and update various call billing parameters (SCI) such as the caller rates for calls made to the sponsor number (i.e., 900-NXX-XXXX).

The present invention enables the sponsor to interact with CSN 100 by connecting the sponsor equipment (e.g., computer terminal) 106 via facility 107 to the Operations Support System (OSS) 190. By accessing an OSS 190, the sponsor is able to specify substantially in real time the SCI for calls to the sponsor number. In step 502, the sponsor specifies SCI data including (a) the rates the sponsor wishes the caller to pay, (b) the time duration of such rate (in any time increments such as seconds, minutes, hours, etc., at the option of the sponsor), (c) additional combinations of the rate and time durations to allow as many combinations as necessary, (d) the amount of free time the sponsor wishes to provide to the caller (so that they can play an announcement informing the caller of the premium charges involved and satisfy the regulatory requirements), (e) the rate modifiers, which are dependent on their routing plans, so that the sponsor can vary the callers' rates by the callers' geographical location, and (f) other indicators and descriptors suitable to the sponsor's unique needs.

In step 503, the sponsor may additionally select call routing options and specify the routing of calls that they receive. Thus, for example, calls can be routed and charged to different sponsor locations based on time of day (TOD), day-of-week (DOW), calling party, calling party location, type of call, type of service, called number, caller entered digits, etc. FIG. 6 illustrates that the sponsor can vary the routing number and associated charges by TOD, DOW, etc., for a given dialed number. A sponsor may also subscribe to more than one dialed number. Shown in FIG. 7 is a sponsor record where call routing and charging are dependent on the dialed number.

In step 505, OSS 190 formulates the sponsors record (FIG. 4) embedding within it the rate information specified by the sponsor. This customer record (FIG. 7) is transmitted to a database machine such as Network Control Point (NCP) 180 which stores the customer record in its database (e.g., 185). By updating the customer record whenever the sponsor has made changes to their call rate, CSN 100 enables substantial real time call rating flexibility for the sponsors.

In step 509, as previously noted, NCP 180 accesses the NCP data base using the dialed number to obtain the sponsor record. Thereafter, NCP 180 obtains the appropriate routing number and the associated SCI parameters.

Additionally, the present invention may also be utilized to enable the sponsor to bill the caller for goods purchased over the telephone from the sponsor in addition to services provided by the sponsor. Furthermore, the invention may be utilized to accept caller-specified charges (e.g., donation made to a charity sponsor) which are entered by the caller and incorporated in the AMA record.

The sponsor can change the rate substantially in real time. In one example, assume that the sponsor is in the business of providing expert consultation services. When the caller makes a call and pays the sponsor's premium charges, the caller may not wish to hear an answering machine. To better serve their clients, the sponsor might wish to set the rate to zero when the experts are not available (making it, in effect, a toll free call to the caller). When the experts return, the sponsor might reset the charges back to the original value. This improves the quality of the service to both caller and the sponsor.

The sponsor can specify the rates in real time. In this example, assume the sponsor is advertising their service using television media. If the sponsor is not sure what price the products will bear, the sponsor can adjust the rate and determine the demand for the product in real time. This allows the sponsor to offer "limited time sale" of their goods and services.

The sponsor can specify that the rate varies by the caller's geographical location. This allows the sponsor to price their products differently in different regions. In doing so, they can stimulate their products in new regions of the country.

Since the toll switch in the network stores the rate information in the billing record during the actual call, it is possible for either the caller or the sponsor, or both, to specify the charges the caller wishes to pay and include them in the billing record. This mechanism simplifies applications such as telethons. In this instance, the sponsor will verbally obtain the caller's contribution. Both the caller and the sponsor will then enter the contribution, using their telephone equipment. The two entries will be transmitted to a computer in the network. If both the numbers agree, that amount will be entered into the billing record as the caller's contribution to the sponsor's solicitation. This eliminates the need for the sponsor to separately bill the caller or the credit card company.

Other sponsors may wish to offer computer software and hardware support. They may typically want to allow their users free service during a warranty period and charge them for their services after the warranty has expired. These customers do not wish to use a combination of 800 and 900 numbers since the callers may continue to use 800 numbers even after the warranty period has expired.

The RM parameter, in conjunction with the call prompter, can be used to address this need. Callers will dial a sponsor number and hear a network prompt to 'press 1 if in warranty, 2 if out of warranty'. If the caller pressed '1', the NCP will process the customer record for this prompt and forward the call to the CPE. This part of the call will have RM=000% (a free call to the caller). The CPE will request the caller to enter an authorization code which will be validated. If an out-of-warranty caller has selected choice '1', the call would be terminated by the CPE. If the caller presses choice '2', the RM parameter in the customer record at the NCP will be to a non-zero value (and the caller will be charged for the call).

Using this invention, the callers can charge their value-added calls to their telephone number, carrier-provided credit cards (e.g., calling cards), Commercial Credit Cards (e.g., Visa, American Express), or use Sponsor-Created Credit cards (SCC) for the service. This invention also permits a convenient scheme for the sponsors to create and maintain their own specialized credit cards to meet the unique needs of their service. The network provides the authorization, validation, billing and collection services for the sponsor's credit card.

Figure 8:
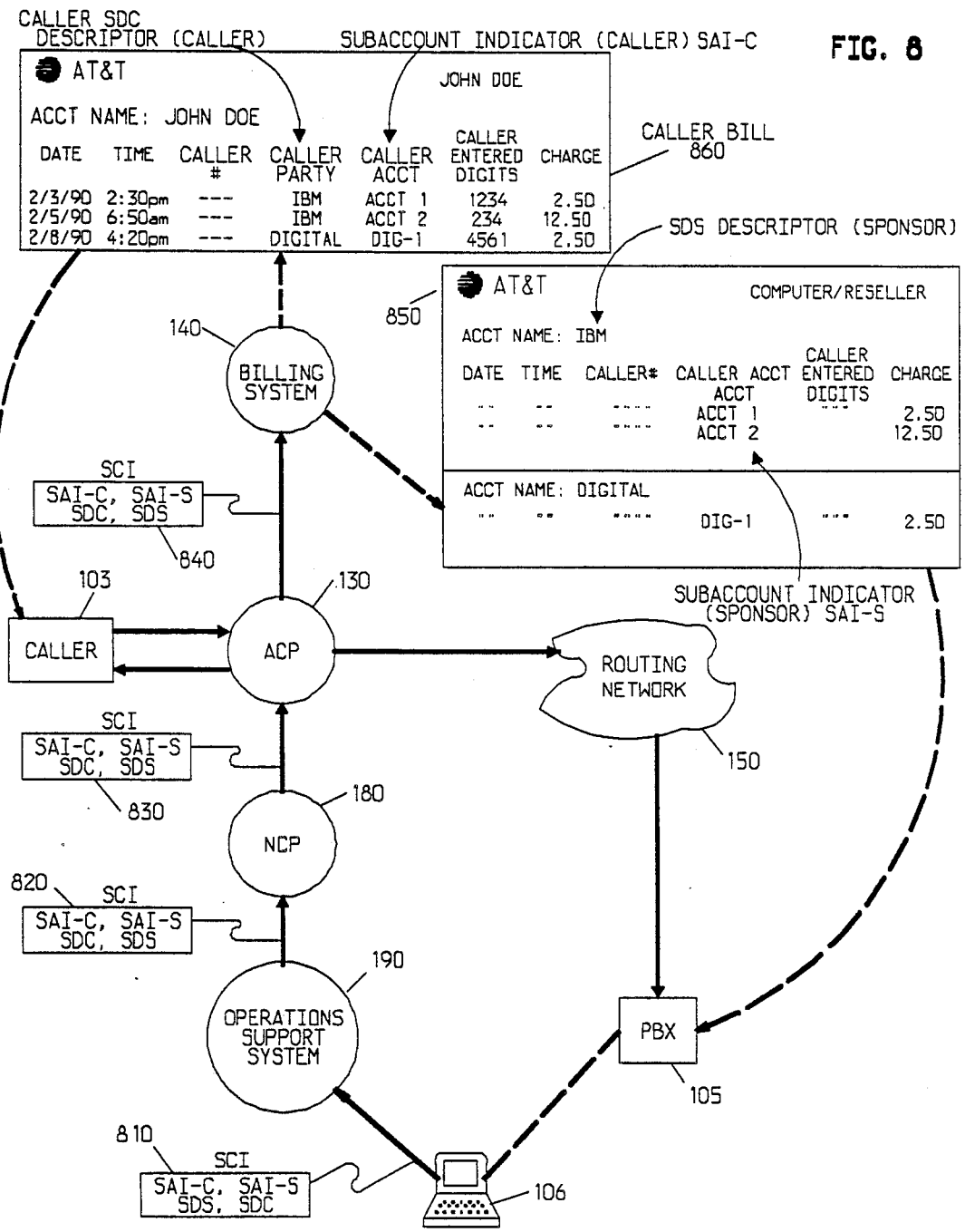
FIG. 8 shows the use of Subaccount Indicators and the call descriptors in the caller and the sponsor bill.

FIG. 8 describes an application of the present invention. This application represents the use of indicators and descriptors specified by the sponsor for subaccount billing and providing customized messages in the caller bill. This arrangement of the present invention can be advantageously used by resellers, who have contracted with the carrier service network to provide value-added service to multiple clients.

The sponsor uses a terminal interface 106 to Operations Support System 190 to define the parameters in the Sponsor-Specified Caller Rate Information (SCI). In particular, the following parameters, shown in 810, will be used in the present application: (a) a Subaccount Indicator-Sponsor (SAI-S), (b) a Sponsor Descriptor for Sponsor (SDS), (c) a Subaccount Indicator-Caller (SAI-C) and (d) a Sponsor Descriptor for Caller (SDC). The parameters (a) and (b) appear in the sponsor's billing statement and the parameters (c) and (d) will appear in the caller's bill.

The Operations Support System 190 forwards the information in SCI to the NCP 180. The set of parameters 810 are forwarded to the NCP 180 as 820. When the caller 103 makes a value-added call to the sponsor 105, the call is processed at the ACP 130. The ACP sends a query to the NCP 180. In response to the query, the NCP 180 transmits to the ACP 130 the information set 830. The set of parameters contained in 820 is duplicated by the NCP 180 as the information set 830 to the ACP 130. The ACP 130 processes the call and forwards the call to the sponsor 105 through the network 150.

The ACP 130 also creates an AMA record for the call. The AMA record includes the set of parameters SAI-S, SDS, SAI-C and SDC as the information set 840. The ACP 130 sends the AMA record to the billing system.

The billing system processes the information contained in the AMA record to create the sponsor's billing statements and the caller's bill. The sponsor's bill includes all the calls made to the sponsor's 900 number and the revenues or charges associated with each call. In addition, the sponsor's statement also includes, for every call, the SAI-S indicator and the SDS descriptor. This allows the sponsor to sort the records by SAI-S indicator or SDS descriptor. This arrangement can be used by the resellers by defining each SAI-S indicator to represent a client. Using the SAI-S indicator and the SDS descriptor, the resellers determine the revenues due to each of their clients.

The billing systems also create a caller bill for each call. The billing system displays the SDC descriptor and the SAI-C indicator in the caller bill for the value-added call. This allows the sponsor to display specific customized messages in the caller bill, allowing the caller better information regarding the nature of the value-added call. The SAI-C indicator also allows the caller to maintain multiple subaccounts for the value-added calls and bill their clients accordingly.

Figure 9:
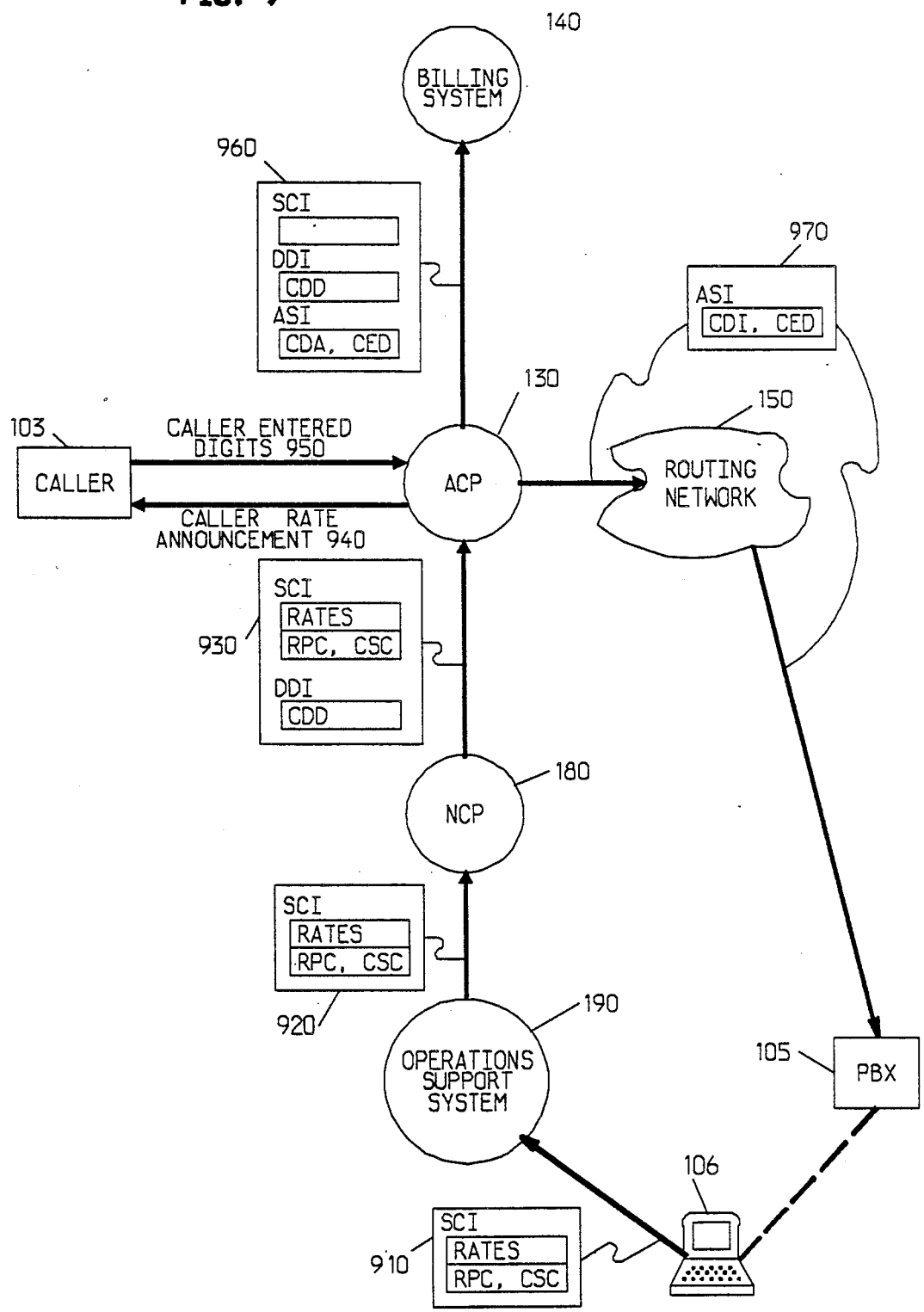
FIG. 9 describes the new interactions possible with the caller, including paying rate information to the caller and allowing caller to define the charges for the value-added call.

FIG. 9 represents another application of the present invention. This arrangement allows the sponsor to provide the rate information to the caller from the network announcements, or to determine the rates depending on the caller-entered digits in response to announcements. This technique may also be used to let the callers define the charges they wish to pay for the call. Unique applications such as telethons where callers can contribute different amounts to the sponsor are made possible using this arrangement.

The sponsor uses terminal interface 106 which connects to the Operations Support System 190, to define the parameters in the Sponsor-Specified Caller Rate Information (SCI). In particular, the following parameters, shown in 910, will be used in the present application: (a) the Rate and Time Period parameters, defining the rate for the call, (b) Rate Prompt to Caller (RPC) parameter which indicates that ACP 130 should prompt the caller for the charges associated with the value-added call, and (c) Caller Specified Charges (CSC) parameter which indicates that the charges associated with this particular call will be determined by the digits entered by the caller.

Operations Support System 190 forwards the information in SCI to NCP 180. The set of parameters 910 are forwarded to NCP 180 as shown by 920. When caller 103 makes a value-added call to sponsor 105, the call is processed at ACP 130. The ACP 130 sends a query to NCP 180. In response to the query, NCP 180 transmits to ACP 130 the information set 930. The set of parameters contained in 920 is duplicated by NCP 180 as the information set 930 to ACP 130.

On receipt of the RPC "Control Parameter", ACP 130 determines the charges from the SCI parameters and plays an announcement 940 to the caller, informing the caller of the charges associated with the value-added call. The ACP 130 may also prompt the caller to enter certain digits. These digits may be used either to route the call, or to determine various billing choices, or both. The ACP 130 processes the call and forwards the call to the sponsor 105 through the network 150. The ACP 130 includes the caller-entered digits 950 to the sponsor's location as 970 and includes the digits in the Caller Entered Digits (CED) parameter in the ACP Specified Information (ASI) set.

The ACP 130 also creates an AMA record for the call. The AMA record includes the set of parameters in ASI in 960. The ACP 130 sends the AMA record to the billing system. The billing system processes the information contained in the AMA record to create the caller's bill. The billing system can then define the charges based on the digits entered by the caller.

Figure 10:
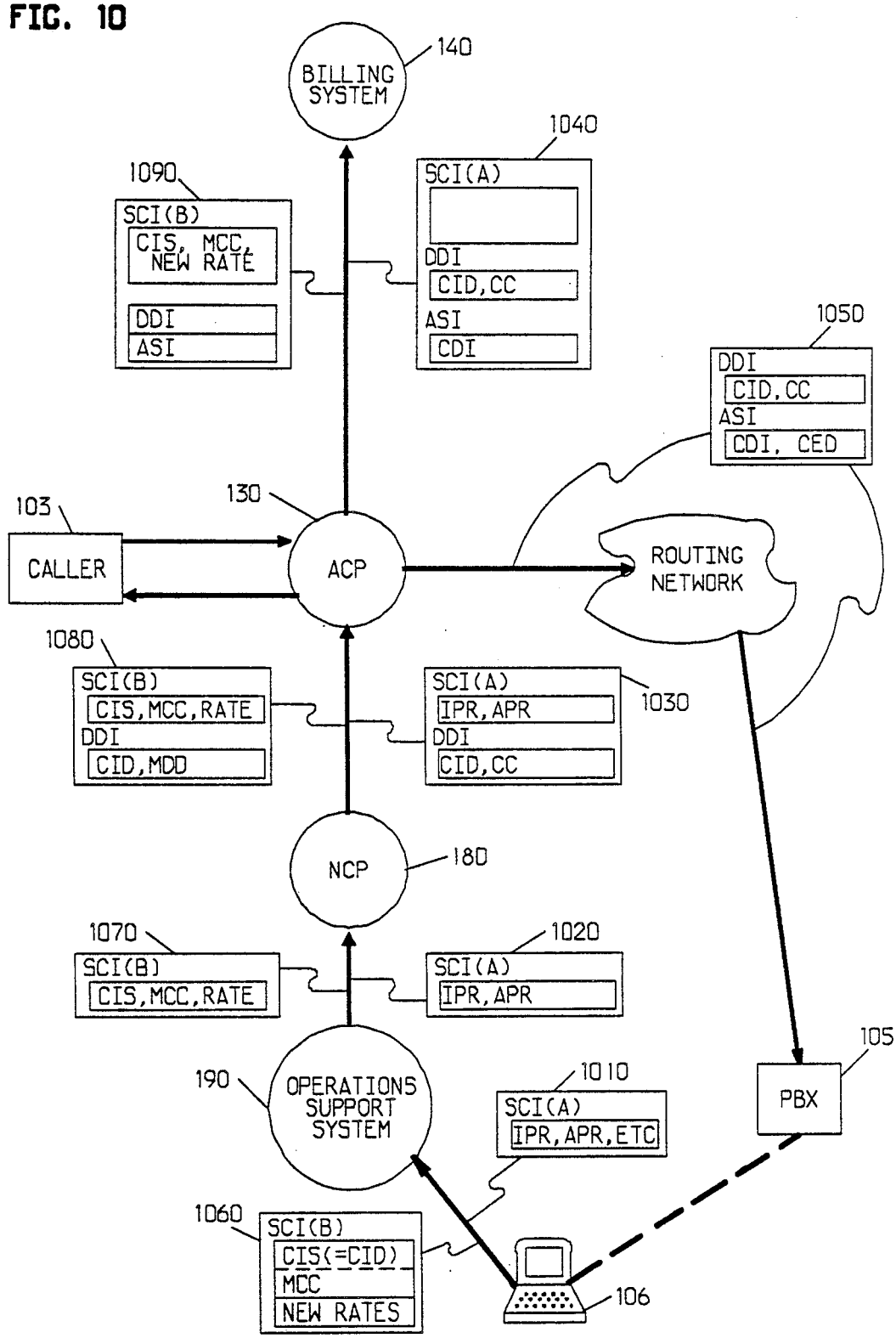
FIG. 10 illustrates a procedure by which the sponsor is able to modify the rate of the value-added call at any time. With the present invention, the sponsor can define the rate prior to the call set-up, while the call is in progress or after the call has been terminated.

FIG. 10 represents yet another application of the present invention. The present invention allows the sponsor to define the charges the callers pay to access the charges at any time. The sponsor specifies the charges prior to the initiation of the call. The sponsor is also able to modify the charges associated with the call while the call is in progress or even after the call has been terminated in the network. This flexibility to the sponsor is possible in the present invention by allowing the sponsor to send specific instructions through the network to the billing system as well as providing the sponsor the ability to uniquely identify a particular call out of the many other value-added calls.

The sponsor uses a terminal interface 106 to Operations Support System 190 to define the parameters in the Sponsor Specified Caller Rate Information (SCI). In particular, the Rate and Time parameters, shown in 1010, will be used in the present application.

The Operations Support System 190 will forward the information in SCI to the NCP 180. The set of parameters 1010 are forwarded to the NCP 180 as shown by 1020. When the caller makes a value-added call to the sponsor 105, the call is processed at the ACP 130. The ACP sends a query to the NCP 180. In response to the query, NCP 180 transmits to ACP 130 the information set 1030. The set includes the SCI parameters contained in 1020, and a unique Call Identifier-Database (CID) parameter in the Database Defined Information (DDI) set.

On receipt of the response from NCP 180, the ACP 130 routes the call to the sponsor 105 through the network 150. The ACP 130 populates the rate information and the CID parameter in the billing record created at ACP 130 for the value-added call. The ACP 130 also forwards to the sponsor the parameter CID and the Call Disposition Information (CDI) parameter during the call set up.

If the sponsor wishes to modify the charges associated with the call either while the call is in progress, or after the call has been terminated, the sponsor will send a new message 1060 to the Operations Support System 190 using the terminal interface 106. This message will include the new rates associated with the call, the Modify Charge to Call (MCC) parameter, and identify the affected call the unique Call Identifier-Sponsor (CIS). The sponsor will copy the CID parameter received from the network into the CIS parameter field.

The Operations Support System forwards the parameter set 1060 to NCP 180 as 1070. The NCP 180 defines the parameter Message Disposition-Database (MDD) parameter which requires the ACP to create an updated billing record in the absence of the corresponding call. The NCP 180 sends the information set 1080, which includes the SCI and DDI parameters, to the ACP 130. Note that the present invention allows the sponsor to forward parameters and control information to ACP 130 and the billing system even in the absence of value-added calls. The ACP 130 will create an updated billing record 1090 which includes the modified charges associated with an earlier value-added call.

Thus, what has been described is a preferred embodiment of the invention. Other methods, sequences or arrangements can be used to implement the present invention by those skilled in the art without departing from the spirit and scope of the present invention.

We claim:

1. A method of operating a billing system for billing a caller for charges incurred during a call made over a communication network to a sponsor-provided number, the method comprising the steps of
    enabling at least one predetermined party of a group of parties associated with the call including the caller, a called party and a sponsor of said call to enter at least one call billing parameter directly to the billing system and
    creating a separate billing record specifying the calling charge for each call to the sponsor number including a party-specified charge determined using said at least one billing parameter.

2. A method of operating a data base system for billing a caller for charges incurred during a call made over a communication network to a sponsor-provided number, the method comprising the steps of
    enabling at least one predetermined party of a group of parties associated with the call including the caller, a called party and a sponsor of said call to enter at least one call billing parameter directly to the data system and
    sending said at least one call billing parameter from said data base system to a billing system for each call made to the sponsor number.

3. A method of operating a switching system for billing a caller for charges incurred during a call made over a communication network to a sponsor-provided number, the method comprising the steps of
    enabling at least one predetermined party of a group of parties associated with the call including the caller, a called party and a sponsor of said call to enter at least one call billing parameter directly to the switching system and
    sending said at least one call billing parameter from said switching system to a billing system for each call to the sponsor number.

4. The method of claim 1, 2 or 3 further comprising the step of
    determining and validating a billing number to be billed for said call to said sponsor number.

5. The method of claim 4 wherein said determining and validating uses the station number of a caller as determined by the network for the billing number.

6. The method of claim 4 wherein said determining step uses a number received from a caller as the billing number.

7. The method of claim 6 wherein said number received from a caller is a caller's card number.

8. The method of claim 6 wherein said number received from a caller is the caller's credit authorization number defined by the sponsor.

9. The method of claim 1, 2 or 3 wherein the party-specified charge is determined using both at least one caller-entered billing parameter and at least one sponsor-entered billing parameter.

10. The method of claim 1, 2 or 3 wherein the calling charge includes a charge specified by the caller.

11. The method of claim 10 wherein the billing method includes the step of validating the caller-specified charges entered.

12. The method of claim 1, 2 or 3 wherein said at least one billing parameter includes a calling charge rate per fixed time period.

13. The method of claim 12 wherein an enabled sponsor party enters at least one billing parameter which includes a separate initial period and an additional period charge parameter.

14. The method of claim 1, 2 or 3 wherein an enabled sponsor party enters at least one billing parameter which specifies a free period length during which no calling charge is assessed to the caller for a call to the sponsor number not exceeding such length.

15. The method of claim 1, 2 or 3 wherein said at least one billing parameter includes a fixed charge per call.

16. The method of claim 1, 2 or 3 wherein an enabled sponsor party enters at least one call billing parameter which specifies the calling charges as a function of the caller's geographic area.

17. The method of claim 1, 2 or 3 wherein the calling charges vary with the time of day in accordance with said at least one call billing parameter specified by an enabled sponsor party.

18. The method of claim 1, 2 or 3 wherein the calling charges vary with the day of week in accordance with said at least one call billing parameter specified by an enabled sponsor party.

19. The method of claim 1, 2 or 3 wherein the calling charges vary with the day of year in accordance with said at least one call billing parameter specified by an enabled sponsor party.

20. The method of claim 1, 2 or 3 wherein the calling charges vary in accordance with the digits entered by the caller in response to an announcement played thereto.

21. The method of claim 1, 2 or 3 wherein said at least one call billing parameter identifies the type of call being billed.

22. The method of claim 1, 2 or 3 wherein said at least one call billing parameter includes a subaccount indicator which is outputted to the sponsor for call billing.

23. The method of claim 1 wherein the billing record includes a caller billing record.

24. The method of claim 1 wherein the billing record includes a sponsor billing record.

25. The method of claim 1, 2 or 3 wherein said at least one call billing parameter includes a subaccount indicator which is outputted to the caller as part of the caller's billing record.

26. The method of claim 1, 2 or 3 wherein said said sponsor is an enabled party that specifies textual descriptors which are outputted to the sponsor as part of the sponsor's billing record.

27. The method of claim 1, 2 or 3 wherein said sponsor is an enabled party and wherein the billing record includes sponsor-specified textual descriptors which are outputted to the caller as part of the billing record.

28. The method of claim 1, 2 or 3 wherein an enabled sponsor party enters at least one billing parameter which includes a billing option parameter (BOP) to specify what part of a network connection transport charge is to be paid by the caller.

29. The method of claim 1, 2 or 3 wherein said sponsor is an enabled party that enters at least one billing parameter including a rate modifier (RM) parameter which provides a billing number discount to be applied to the calling charge.

30. The method of claim 2 or 3 wherein the determining and validating step determines the caller's billing number by checking if the caller's station number is received during call set-up and if the caller's station number is not received during call set-up allowing the caller to reach an operator of said billing system and charge the call to the caller's card number.

31. The method of claim 1, 2 or 3 wherein said sponsor is an enabled party and wherein said sponsor can change said at least one call billing parameter during a time period selected from a group of time periods including a time period (1) before the call is connected (2) during the call connection and (3) after the call termination.

32. The method of claim 31 further comprising the steps of
identifying said call by a unique call identifier determined by the communication network,
sending the unique call identifier to the billing system and to the sponsor,
receiving from the sponsor a modified call billing parameter associated with the unique call identifier, and
sending the modified call billing parameter associated with the unique call identifier to the billing system.

33. The method of claim 1, 2 or 3 wherein said sponsor is an enabled party and wherein a calling rate announcement is played to the caller during the call, the calling rate announcement being determined using sponsor-specified call billing parameters.

34. The method of claim 1, 2 or 3 wherein the sponsor number identifies a sponsor location.

35. The method of claim 1, 2 or 3 wherein the sponsor number identifies a non-sponsor location.

36. A method of enabling a sponsor to directly enter call billing parameters into a data base of a billing system to be used to bill a subsequent caller for charges incurred for a call made over a communication network to a sponsor-provided number, the method comprising the steps of:
establishing a direct connection between said sponsor and said billing system and
enabling said sponsor to enter at least one call billing parameter directly to the data base of said billing system over said established connection.

37. Apparatus for billing a called party for charges incurred for a call made over a communication network to a sponsor-provided number, comprising
means for enabling at least one predetermined party of a group of parties associated with the call, including the caller, a called party, and a sponsor of said call to enter at least one call billing parameter directly to the billing apparatus; and
means for creating said separate billing record for each call to the sponsor from the caller, including a party-specified calling charge incurred during said call and determined using said at least one billing parameter.

38. Apparatus for billing a caller for charges incurred for a call made by the caller to a sponsor-provided number, comprising
a switching network for establishing a connection between the caller and the sponsor number,
means for updating call billing parameter substantially in real time using data received from a sponsor, and
means for creating said separate billing record for each call to the sponsor from the caller, including a party-specified calling charge incurred during said call and determined using said at least one billing parameter.

39. Data base system for billing a caller for charges incurred during a call made over a communication network to a sponsor-provided number, the method comprising the steps of
means for enabling at least one predetermined party of a group of parties associated with the call including the caller, a called party and a sponsor of said call to enter at least one call billing parameter directly to the data base system, and
means for sending said at least one call billing parameter from said data base system to a call billing system for each call made to the sponsor number.

40. Switching system for billing a caller for charges incurred during a call made over a communication network to a sponsor-provided number, the method comprising the steps of
means for enabling at least one predetermined party of a group of parties associated with the call including the caller, a called party and a sponsor of said call to enter at least one call billing parameter directly to the switching system and
means for sending said at least one call billing parameter from said switching system to a billing system for each call to the sponsor number.

* * * * *